United States Patent [19]

Crandall

[11] 4,301,214
[45] Nov. 17, 1981

[54] LOW THERMAL EXPANSION CERAMIC AND PROCESS

[75] Inventor: William B. Crandall, Alfred Station, N.Y.

[73] Assignee: Alfred University Research Foundation, Alfred, N.Y.

[21] Appl. No.: 216,196

[22] Filed: Dec. 15, 1980

[51] Int. Cl.$^3$ .................... C04B 33/00; C04B 33/04; C04B 33/24
[52] U.S. Cl. .................................. 428/446; 428/448; 428/454; 501/141; 501/149
[58] Field of Search .................... 106/45, 48, 46, 71; 428/446, 448, 454

[56] References Cited

U.S. PATENT DOCUMENTS

| | | | |
|---|---|---|---|
| 3,279,930 | 10/1966 | Van Der Beck, Jr. | 106/73.4 |
| 3,650,817 | 3/1972 | Motoyuki | 106/46 |
| 3,817,763 | 6/1974 | Smyser | 106/45 |

Primary Examiner—O. R. Vertiz
Assistant Examiner—Mark Bell
Attorney, Agent, or Firm—Fred L. Denson

[57] ABSTRACT

A ceramic product having an expansion coefficient from about $1.0 \times 10^{-6}$ °C. to about $2.5 \times 10^{-6}$ °C. containing a sintered mixture of spodumene and clay is described. The sintered mixture also includes iron oxide in an amount from about 1.0% to about 7.0% by weight of the total sintered mixture. The final product includes a $\beta$ spodumene solid solution and mullite, and has a mullite content of less than 10% by volume. The presence of iron oxide in the sintered mixture reduces the formation of mullite during the formation of $\beta$ spodumene and thus reduces the expansion coefficient of the final product. The process for preparing the ceramic products described herein includes providing an intimate mixture of 40% by weight to 60% by weight of spodumene and 40% by weight to 60% by weight of clay and heating the mixture in the presence of iron oxide at a suitable time and temperature, within a range from cone 5 to cone 10 and preferably within a range from cone 6 to cone 9.

The ceramic body is coated with a suitable glaze which preferably contains from about 70% by weight to about 90% by weight of spodumene and from about 10% by weight to about 30% by weight of talc and 20% by weight to about 10% by weight of whiting. The glaze composition also includes from about 1.0% by weight to about 7.0% by weight of iron oxide. The base portion of the ceramic products of this invention is optionally coated with a suitable terra sigillata for aesthetic purposes and also to avoid sticking of the product to the furnace during the firing process. The terra sigillata composition typically contains from about 10% by weight to 35% by weight of spodumene, 65% to 90% by weight of clay and 1% by weight to 7% by weight of iron oxide.

Because of their low expansion coefficients the products of the invention are useful for a multitude of household purposes. They can readily withstand the thermal shock encountered when exposed to the extreme heating or cooling conditions normally present in household environments.

9 Claims, No Drawings

LOW THERMAL EXPANSION CERAMIC AND PROCESS

BACKGROUND OF THE INVENTION

This invention relates to a low thermal expansion ceramic product and to a process for its preparation.

Extensive efforts have been made to develop and manufacture ceramic products having flameware type bodies. Included among these products are those that can withstand the thermal shock which is associated with successive exposure of formed products to normal household oven and freezer temperatures. Such products must necessarily be fabricated from materials which have a suitable plasticity to facilitate shaping for a variety of household uses and must also have a high resistance to thermal shock. Few products of this type have been commercially successful either because of the cost of the starting materials or because of costs involved in the manufacturing process. Some commercially available low expansion products are made by focusing a composition into glass, pouring the glass into a mold and shaping a crystalline product by crystal nucleation and growth under very controlled thermal conditions. The disadvantage of these types of manufacturing processes are that they require expensive manufacturing facilities.

Suitable products having coefficients of linear expansion of less than $2.5 \times 10^{-6°}$ C. have also been prepared from various combinations of clay with various types of lithium aluminum silicates using standard pottery making materials, equipment and processes. A typical process of this type is described in U.S. Pat. No. 3,279,930 issued to Roland R. Van Der Beck, Jr. on Oct. 18, 1966. The starting materials used in the process include a kaolin or ball clay and a relatively pure ceramic grade of $\alpha$ spodumene. The materials are sintered at a suitable temperature and time (between Orton cones 12 and 16) to provide a composition containing 14% to 36% by weight of mullite and 64% to 86% by weight of $\beta$ spodumene. Deviations from the specified process result in solid solutions which fall outside of the desired ranges and which do not have expansion coefficients which are less than $2.5 \times 10^{-6°}$ C. The process has several disadvantages including the high cost and lack of availability of relatively pure ceramic grade spodumene. Another disadvantage involves the process conditions which must be carefully controlled to ensure that the final $\beta$ spodumene solid solution and mullite composition contains mullite within a specific range to provide a suitable low thermal expansion coefficient. Needless to say, such carefully controlled conditions effect the cost of the final product.

The coefficients of linear expansion of $\beta$ spodumene and mullite are $0.5 \times 10^{-6°}$ C. and $4.5 \times 10^{-6°}$ C. respectively. The expansion coefficients for various compositions of the two materials generally are a linear function of the amount of each of the materials in the final composition. It is recognized that other materials may be present in ceramic products such as those disclosed by Van Der Beck, and that such materials can effect the coefficient of expansion of the product. However, this effect is somewhat insignificant when the final product is comprised primarily of $\beta$ spodumene solid solution and mullite. Thus, it is advantageous to minimize the formation of mullite in order for the final product to have an expansion coefficient which is as close as possible to that of $\beta$ spodumene. Invariably however, some mullite will be formed during the process of converting $\alpha$ spodumene to $\beta$ spodumene because of the starting materials used and time-temperature conditions utilized to effect the conversion.

Based on the foregoing discussion it is evident that a need exists for a low-thermal expansion ceramic which may be economically produced from inexpensive materials and is useful for flameware and household purposes.

OBJECTS OF THE INVENTION

It is therefore an object of this invention to provide a low thermal expansion ceramic product for household usage from relatively inexpensive pottery making materials.

It is another object of this invention to utilize inexpensive pottery processes to prepare the low thermal expansion products in this invention.

Still another object of this invention is to provide a suitable glaze for the ceramic products of this invention.

A further object is to provide a terra sigillata for use with the ceramic products of this invention.

SUMMARY OF THE INVENTION

These and other objects are accomplished with a ceramic product having an expansion coefficient from about $1.0 \times 10^{-6°}$ C. to about $2.5 \times 10^{-6°}$ C. containing a sintered mixture of spodumene and clay. The sintered mixture also includes iron oxide in an amount from about 1.0% to about 7.0% by weight of the total sintered mixture. The final product includes a $\beta$ spodumene solid solution and mullite, and has a mullite content of less than 10% by volume. The presence of iron oxide in the sintered mixture reduces the formation of mullite during the formation of $\beta$ spodumene and thus reduces the expansion coefficient of the final product. The process for preparing the ceramic products described herein includes providing an intimate mixture of 40% by weight to 60% by weight of spodumene and 40% by weight to 60% by weight of clay and heating the mixture in the presence of iron oxide at a suitable time and temperature, within a range from cone 5 to cone 10 and preferably within a range from cone 6 to cone 9.

A suitable glaze for coating on the ceramic bodies of this invention preferably contains from about 70% by weight to about 90% by weight of spodumene and from about 10% by weight to about 30% by weight of talc and 2% by weight to about 10% by weight of whiting. The glaze composition also includes from about 1% by weight to 7% by weight of iron oxide. The base portion of the ceramic bodies of this invention is optionally coated with a suitable terra sigillata for aesthetic purposes and also to avoid sticking of the product to the furnace during the firing process or later in use on a hot burner surface. The terra sigillata composition typically contains from about 10% by weight to 35% by weight of spodumene, 65% to 90% by weight of clay and 1% by weight to 7% by weight of iron oxide.

Because of their low expansion coefficients, the products of the invention are useful for a multitude of household purposes. They can readily withstand the thermal shock encountered when exposed to the extreme heating or cooling conditions normally present in household environments.

DETAILED DESCRIPTION OF THE INVENTION

The basic starting materials of clay and spodumene used in the invention are commonly used in ceramic processes. They are readily available and thus relatively inexpensive. The preferred clay is any aluminum silicate having a plasticity which permits it to be readily molded into various shapes. Jackson ball clay is typically suitable. Blends of Jackson ball clay with up to 25% of a kaolin such as E. P. K. clay, helps to reduce the sticky nature of the clay which is utilized. The composition of the spodumene employed is dependent upon the supplier. While any commercially available α spodumene may be used in the process described herein, a preferred material is Foote Mineral Chemical Spodumene having a mesh of 200 or 50/200. The amount of iron oxide ($Fe_2O_3$) used preferably ranges from about 3.5% to about 6.0% by weight of the sintered mixture.

The firing conditions which are employed are selected so as to enhance the formation of β spodumene and minimize the formation of mullite since β spodumene has a low coefficient of expansion, $0.5 \times 10^{-6}°$ C. and mullite has a much greater expansion coefficient of $4.5 \times 10^{-6}°$ C. While β spodumene is readily formed at firing temperatures of 1240° C. to 1270° C., there is also a strong tendency to form mullite at these temperatures. The presence of iron oxide, however, promotes the formation of β spodumene and also aids in limiting the relative volume of mullite in the composition to less than 10%. The firing conditions range from cone 5 to cone 10 and preferably from cone 6 to cone 9. The formation of mullite is greatly accelerated above cone 10 and particularly at temperatures above 1300° C.

Careful control of the amoung of iron oxide present in the sintered mixture of spodumene and clay is essential. While the improved results of this invention are observed when iron oxide is present in the mixture within the previously designated ranges, the precise manner in which the iron oxide functions to provide these results is not presently known. However, the results of scanning electron microscope (SEM) studies for various body compositions within this invention indicates that in most instances, iron oxide is found only in the β spodumene crystals when the amount of iron oxide is less than about 2%. As the amount of iron oxide increases beyond 2% up to about 5%, the iron oxide becomes saturated in the crystals and shows up in the glassy grain boundary of the body as well as in the β spodumene crystals. When the amount of iron oxide is increased beyond 5% through about 10%, the iron oxide shows up in new forms of crystals, e.g. $Fe_2O_3$-$TiO_2$ (when $TiO_2$ is present) and $Fe_2O_3$ alone. The SEM studies also show that the amount of crystalline substances in the body increases as the amount of iron oxide is increased from about one to about seven percent.

Based on the foregoing SEM studies, it has been concluded that the iron oxide acts as a nucleating agent for the growth of the β spodumene crystals. After decomposition of the clay and the phase change in the spodumene, the iron oxide, which is uniformly distributed throughout the mixture in particulate form, creates the nuclei on which the β spodumene crystals grow. These nuclei are necessary since the decomposed material is essentially amorphous at temperatures between 800° C. and 1100° C. The presence of a large number of nucleating centers dispersed throughout the sintering mixture helps to control the size of the crystals which are formed. A large number of such centers permits the formation of a large number of crystals which are fairly uniform but limited in size. A smaller number of such centers or the absence of any centers allows a somewhat uncontrolled crystal growth on whatever happens to be present. The absence of substantial uniformity in crystal sizes detrimentally effects the strength properties of the body. It has further been concluded from SEM studies that the size of the crystals is also controlled by the minor amount of vitrious glass which is formed during sintering. The iron oxide containing glass is concentrated in the grain boundary surrounding the crystals and thus restricts crystal growth through an encapsulation process.

The process for preparing the low expansion ceramic of this invention includes dry mixing the clay and spodumene together in the presence of the appropriate amount of iron oxide. The mixture is then formed by any suitable technique including casting, jiggering, ramming, throwing or extruding. In preparing the mixture for sintering, conventional binders, fluxing agents, dyes and other additives may be added. However, such additives are not an essential part of the present invention. A glaze containing from about 70% to about 90% by weight of spodumene, from about 10% by weight to about 30% by weight talc, 2% by weight to about 10% by weight of whiting and from about 1.0% to about 7.0% iron oxide is particularly suitable. A terra sigillata of the type previously described is also added to the product to facilitate the firing operation. The product is fired within the indicated time and temperature conditions.

The following illustrative examples are set forth to povide a clearer understanding of the invention and are not to be construed as limiting the principles which underly the spirit and scope of the invention.

EXAMPLE I

A mixture containing 50 parts of Foote Mineral Chemical Spodumene (200 mesh), 40 parts of Jackson ball clay and 10 parts E. P. K. clay is prepared. The mixture also includes 1% by weight of iron oxide based on the weight of the total mixture. The mixture is sintered at cone 10. The expansion coefficient for the resultant product is $1.0 \times 10^{-6}°$ C.

EXAMPLE II

Example I is repeated except that the mixture contains 51 parts of 200 mesh Foote Mineral Chemical Spodumene, 41 parts of Jackson ball clay and 8 parts E. P. K. clay. The mixture also includes 3.6% by weight of iron oxide based on the weight of the total mixture. The mixture is sintered at cone 8 and has an expansion coefficient of $1.0 \times 10^{-6}°$ C.

EXAMPLE III

A glaze having the following composition is applied to the body prepared in the manner described in Example I:

| | |
|---|---|
| Foote Mineral Chemical Spodumene (200 mesh) | 6.9 parts |
| New York State Talc | 14.2 parts |
| Whiting | 3.4 parts |
| E.P.K. clay | 4.85 parts |
| Veegum | 0.65 parts |

The composition also includes 2.4% by weight of iron oxide based on the total composition weight. The glazed body is fired at cone 9. The glaze is observed to have a slightly lower thermal expansion coefficient than the body. The surface is smooth and consistent and there is no evidence of cracking or crazing.

EXAMPLE IV

A glaze having the following composition is applied to the body prepared in the manner described in Example II:

| | |
|---|---|
| Foote Mineral Chemical Spodumene (200 mesh) | 75 parts |
| New York State Talc | 15 parts |
| Whiting | 4 parts |
| E.P.K. clay | 5 parts |
| Bentonite | 1 part |

The composition also includes 3.6% by weight of iron oxide based on the total composition weight. The glazed body is fired at cone 8. After firing, the glazed body is examined. The glaze has a slightly lower thermal expansion coefficient than the body and there is no evidence of cracking or crazing.

EXAMPLES V AND VI

Terra sigillatas having the following compositions set forth in Table A are applied to the bases of the glazed bodies described in Examples III and IV respectively:

TABLE A

| Material | Example V | Example VI |
|---|---|---|
| Thiele RC-32 Clay | 71 | 63 |
| Jackson Ball Clay | 10 | 11 |
| Chemical Spodumene | 13 | 15 |
| Nepheline Syenite | 4 | 4 |
| MnO$_2$ | 2 | 7 |

The composition of Example V also contains 2.3% by weight of iron oxide and Example VI also contains 6.3% by weight of iron oxide. No stilts are required to support either of the ceramic products during the sintering process because the addition of the terra sigillata prevents the product from sticking to the kiln setter.

EXAMPLES VII-XI

Sintering mixtures for Examples VII, VIII and IX are prepared in the manner described in Example I while sintering mixtures for Examples X and XI are prepared in the manner described in Example II.

TABLE B

| Example | Relative Volume % of Observed Phases | | | | Cone No. | Expansion Coefficient $\times 10^{-6}$ °C. |
|---|---|---|---|---|---|---|
| | Spodumene | Mullite | Quartz | Cristobalite | | |
| VII | 89.1 | 6.9 | 4.0 | 0 | 10 | 1.0 |
| VIII | 90.0 | 7.8 | 1.3 | 0 | 8 | 1.0 |
| IX | 85.9 | 9.0 | 5.1 | 0 | 8 | 1.8 |
| X | 87.6 | 7.4 | 5.0 | 0 | 5 | 1.0 |
| XI | 91.2 | 8.0 | 0.8 | 0 | 8 | 2.0 |

EXAMPLE XII

Example VII is repeated except the sintered mixture is fired at cone 12 (1306° C.). The final product contains 12% mullite and has an unacceptable grain growth and mechanical properties.

As previously mentioned, various additives may be added to the bodies and/or glazes falling within the scope of the present invention to effect various properties. These additives and their properties are well known to those skilled in the art. Thus, it is sufficient to merely state that additives are available which effect the plastic working characteristics, casting working characteristic, chip resistance, fracture strength, surface texture and color, body appearance, etc.

The products described herein have low thermal expansion coefficients, a low water permeability of less than 3%, good strength and are inexpensive.

The invention has been described in detail with particular reference to preferred embodiments thereof, but it is understood that variations and modifications can be effected within the spirit and scope of the invention.

I claim:

1. A ceramic product having an expansion coefficient from about $1.0 \times 10^{-6}$° C. to about $2.5 \times 10^{-6}$° C. consisting essentially of a sintered mixture of from about 40% by weight to about 60% by weight spodumene and from about 40% by weight to about 60% by weight clay said mixture also including iron oxide in an amount from about 1.0% to about 7.0% by weight of the total sintered mixture, said product having an x-ray diffraction which shows a composition of B-spodumene solid solution and mullite, wherein the mullite content is less than 10% by volume of the composition.

2. The ceramic product of claim 1 wherein the iron oxide content of the sintered mixture ranges from about 3.5% to about 6.0% of the total sintered mixture.

3. A process for preparing a ceramic product having an expansion coefficient from about $1.0 \times 10^{-6}$° C. to about $2.5 \times 10^{-6}$° C. comprising firing a mixture consisting essentially of from about 40% by weight to about 60% by weight of spodumene, and from about 40% by weight to about 60% by weight of clay in the presence of from about 1.0% to about 7.0% iron oxide within a range from cone 5 to cone 10 to provide a composition of $\beta$ spodumene solid solution and mullite wherein mullite comprises less than 10% by volume of the composition.

4. The process of claim 3 wherein the clay is a ball clay.

5. The process of claim 3 wherein the clay is a mixture of ball clay and kaolin.

6. The process of claim 3 wherein the spodumene is a 200 mesh chemical grade spodumene.

7. A ceramic glaze composition consisting essentially of from about 70% by weight to about 90% by weight of spodumene and from about 10% by weight to about 30% by weight of talc and 2% by weight to about 10% by weight of whiting, said glaze composition also including from about 1.0% by weight to about 7.0% by weight of iron oxide in the glaze composition.

8. A terra sigillata composition consisting essentially of from about 10% to about 35% by weight of spodumene and from about 65% to about 90% by weight of clay, said terra sigillata composition also including from about 1.0% by weight to about 7.0% by weight of iron oxide in the terra sigillata composition.

9. A ceramic product consisting essentially of:
(a) a body having an expansion coefficient from about $1.0 \times 10^{-6}$° C. to about $2.5 \times 10^{-6}$° C. which consists essentially of a sintered mixture of from about 40% by weight to about 60% by weight spodumene and from about 40% by weight to about 60% by weight clay said mixture also including iron oxide in an amount from about 1.0% to about 7.0% by weight of the total sintered mixture, said body having an x-ray diffraction which shows a composition of B-spodumene solid solution and mullite, wherein the mullite content is less than 10% by volume of the composition;

(b) a glaze composition coated on the body consisting essentially of from about 70% by weight to about 90% by weight of spodumene and from about 10% by weight to about 30% by weight of talc and 2% by weight to about 10% by weight of whiting, said glaze composition also including from about 1.0% by weight to about 7.0% by weight of iron oxide in the glaze composition; and (c) a terra sigillata composition applied to the base of the body consisting essentially of from about 10% to about 35% by weight of spodumene and from about 65% to about 90% by weight of clay, said terra sigillata composition also including from about 1.0% by weight to about 7.0% by weight of iron oxide in the terra sigillata composition.

* * * * *